United States Patent [19]

Ratz

[11] Patent Number: 5,226,591
[45] Date of Patent: Jul. 13, 1993

[54] ACTIVE LOW TEMPERATURE LIMIT FOR BATTERY POWERED THERMOSTAT

[75] Inventor: James W. Ratz, Bloomington, Minn.
[73] Assignee: Honeywell Inc., Minneapolis, Minn.
[21] Appl. No.: 978,608
[22] Filed: Nov. 19, 1992
[51] Int. Cl.⁵ ............................................. G05D 23/00
[52] U.S. Cl. ......................................... 236/47; 165/12
[58] Field of Search ................. 236/46 R, 47; 165/12; 364/557

[56] References Cited

U.S. PATENT DOCUMENTS

| | | | |
|---|---|---|---|
| 4,215,408 | 7/1980 | Games et al. | 364/505 |
| 4,217,646 | 8/1980 | Caltagirone et al. | 364/493 |
| 4,308,991 | 1/1982 | Peinetti et al. | 236/46 R |
| 4,386,649 | 6/1983 | Hines et al. | 165/12 |
| 4,506,827 | 3/1985 | Jamieson et al. | 236/46 R |
| 4,799,176 | 1/1989 | Cacciatore | 364/557 |
| 4,946,096 | 8/1990 | Ballard et al. | 236/11 |
| 4,948,044 | 8/1990 | Cacciatore | 236/46 R |

Primary Examiner—William E. Wayner
Attorney, Agent, or Firm—Ian D. MacKinnon

[57] ABSTRACT

A low temperature limit for battery powered thermostats for energizing and de-energizing the heating system when the battery can no longer operate the thermostat. The thermostat comprises a battery powered thermostat control for energizing and de-energizing the heating system and a low temperature limit electrically connected in parallel with the battery powered thermostat control. The battery powered thermostat control disables a controllable switch and, thereby, the low temperature limit bimetal switch when the battery is charged. When the battery is discharged, it enables the low temperature bimetal switch limit. Thereby, when the thermostat is no longer operational, the low temperature limit energizes the heating system when the ambient temperature present on the thermostat is below a preselected temperature.

6 Claims, 4 Drawing Sheets

ACTIVE LOW TEMPERATURE LIMIT FOR BATTERY POWERED THERMOSTAT

FIELD OF THE INVENTION

This invention is in the field of thermostats. Specifically, in the field of battery powered electronic thermostats and safety features incorporated into those thermostats.

BACKGROUND OF THE INVENTION

Electronic thermostats are slowly replacing the mechanical thermostats utilized in the past. However, electronic thermostats have one inherent problem which was not present in the earlier mechanical thermostats. This problem arises when the power source to the electronic thermostat no longer provides power to the thermostat and the thermostat no longer functions. In electronic thermostats, this commonly happens when the batteries which provide power to the thermostat are discharged to such a point that they can no longer operate the thermostat. When the thermostat no longer operates, the heating system also no longer operates, as the thermostat does not complete the circuit that allows for the heating relay to turn on the heating system. Thus, when the batteries in the battery powered thermostat go dead, the thermostat becomes inoperative. As a result, no heat is provided to the controlled space. In climates where the temperature drops below freezing, a problem exists with pipes freezing and possibly rupturing which can damage the space which is being controlled by the thermostat. In prior systems, bimetal switches have been placed across the thermostat contacts. They are then set at a level that will not interfere with the normal thermostat operations. This means in normal operations, the bimetal switch would not be allowed to activate until the temperature dropped to a temperature of approximately 40 F. If the bimetal switch is set at a higher setpoint, the bimetal switch would interfere with the operation of the thermostat if the thermostat was set to its lowest setting. Further, if the bimetal switch is set to maintain at least 40 F, there is a strong possibility that the temperature of the outside walls could drop to 32 F or less. Any pipes contained in these walls could freeze and possibly burst. The present invention provides circuitry to utilize a bimetal switch at a higher setpoint when battery power is low or nonexistent.

SUMMARY OF THE INVENTION

Applicant's invention is a safety circuit which is incorporated into a standard electronic thermostat. The circuit allows for a bimetal switch to be incorporated into the thermostat whenever the electronic thermostat has lost power. When the thermostat senses the battery power is low, a microprocessor within the thermostat causes one of its outputs to go low, thus, turning off a transistor which acts as a switch. During normal operation, this output is held high and the transistor is on. With the transistor off, a triac in series with the bimetal switch is then enabled. The bimetal switch is then enabled in the circuit controlling the heating system. In the present invention, the setpoint of this bimetal switch can be set from 50 F to 55 F, or higher, thus eliminating the possibility of freeze-up of pipes in outside walls. The thermostat utilizes a field effect transistor in combination with a diode bridge and a triac to switch the low limit bimetal switch in and out of the circuit. By removing the bimetal switch from the circuit, the thermostat may operate without any possibility of the bimetal switch interfering with normal operation. However, when battery power is not provided to the thermostat, the operator will wish to have the bimetal switch in the circuit, preventing pipe freeze-up. In order to prevent pipe freeze-up, the thermostat must operate to hold the air temperature at approximately 55 F and thereby prevent the outside walls from dropping to, or below, the temperature of 32 F.

DESCRIPTION OF THE PREFERRED EMBODIMENT

Figure 1:
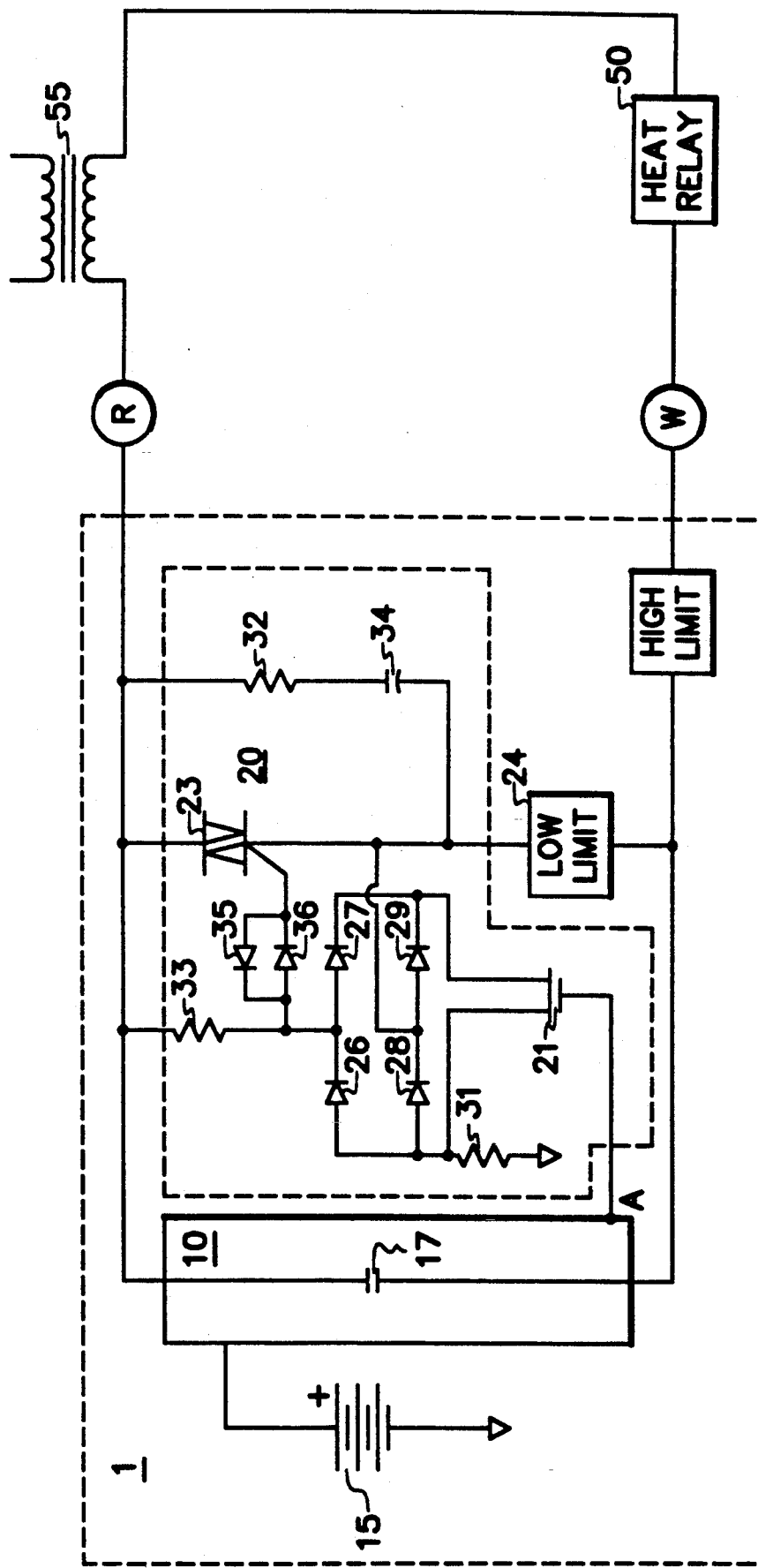
FIG. 1 is a schematic diagram of the thermostat which incorporates the invention and the heating load.

FIG. 1 is a schematic diagram of the invention. Thermostat 1 incorporates a standard electronic thermostat control 10 known to those skilled in the art, which is powered by battery 15. Thermostat control 10 energizes and de-energizes relay 17 based on the ambient temperature in the space in which it is controlling. By energizing relay 17, heat relay 50 energizes, thereby activating the heating load, which is not shown. Heat relay 50 is powered by 24 volt AC transformer 55. Nodes R and W ar utilized to connect power source 55 and heat relay 50 to thermostat 1. Applicant's invention is essentially connected in parallel with thermostat control 10 across input nodes R and W. The invention comprises controllable switch 20 electrically connected to low limit 24 and controlled by an output at node A of thermostat control 10. Thermostat control 10 provides a disable signal to controllable switch 20, more specifically for this embodiment, to FET (Field Effect Transistor) 21. FET 21 is either in an "on" or an "off" state based upon the output of thermostat control 10. The output of thermostat control 10 is based on the power level of battery 15. When battery 15 has sufficient power to operate thermostat 1, the output of thermostat control 10 at node A is a disable signal, or approximately the battery voltage (i.e., 4.5 volt when three AA 1.5 volt batteries are utilized). Thus, when a disable, or approximately 4.5 volt, signal at node A is received by FET 21, FET 21 is turned on and the circuit shown in FIG. 1 is equivalent to FIG. 2.

Figure 2:
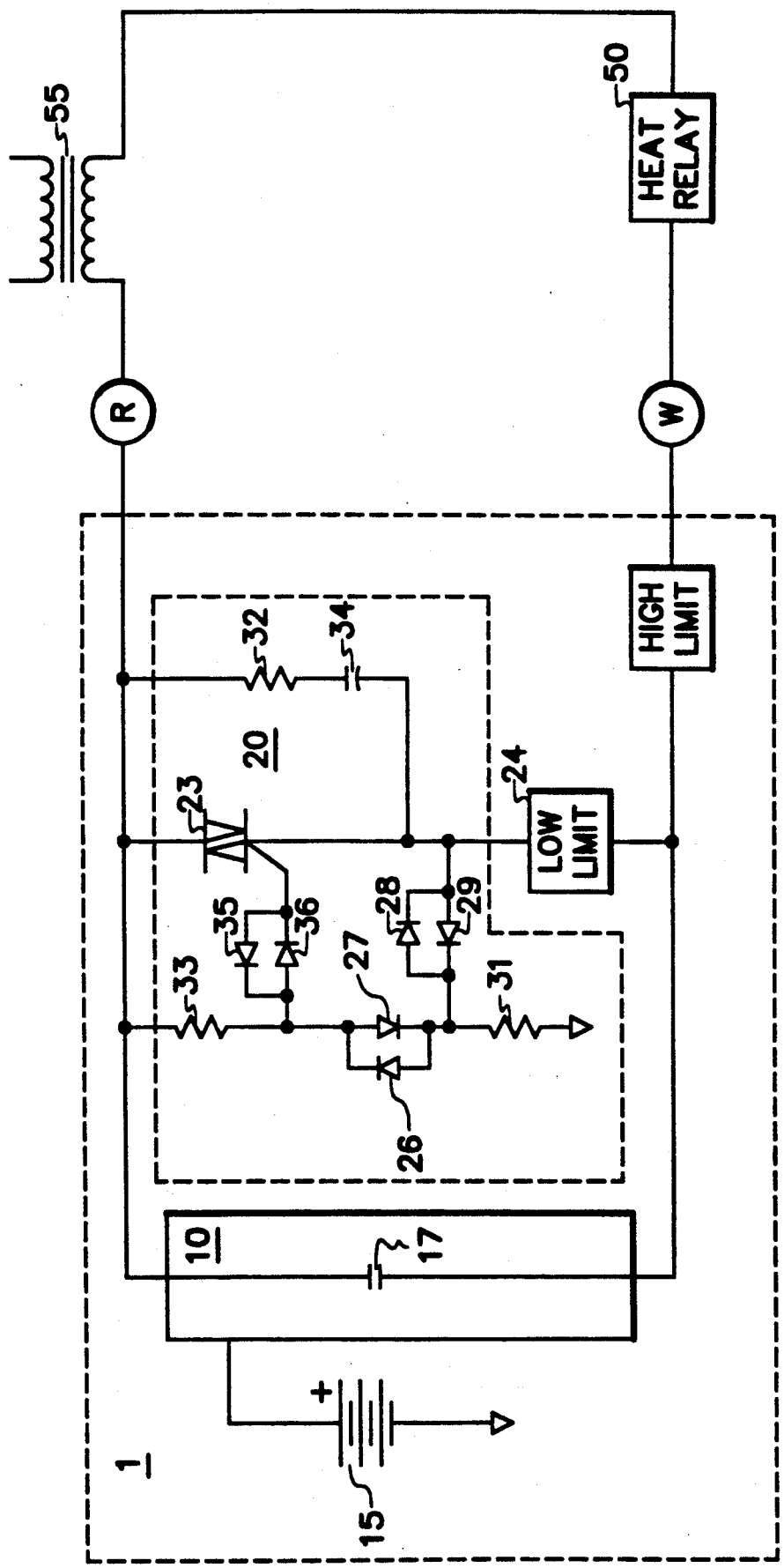
FIG. 2 is a schematic diagram which represents the thermostat when power is provided to the low limit safety circuit.

Controllable switch 20 comprises triac 23, a diode bridge comprising diodes 26, 27, 28 and 29, field effect transistor (FET) 21, resistors 31, 32, and 33, capacitor 34, and diode pair 35 and 36. During normal operation, FET 21 is in a closed mode, or "on" position, and thermostat 1 operates in a manner as shown in FIG. 2. FET 21 "shorts out" the diode bridge made up of diodes 26, 27, 28, and 29, and thus prevents triac 23 from energizing. In effect, low limit bimetal switch 24 is removed from the circuit. However, when battery 15 dies, FET 21 no longer receives a signal from node A and now switches to an open mode, or "off" position, thus removing the short across the diode bridge made up of diodes 26, 27, 28, and 29. Resistor 33 should be selected to be large enough, approximately 5 kilo-ohms to 10 kilo-ohms, such that in a situation where thermostat control 10 operates at a temperature below the setpoint of low limit bimetal switch 24, the current through resistor 33 will not energize heat relay 50. Resistor 33 however, should not be so large as to prevent Triac 23 from being enabled.

Figure 3:
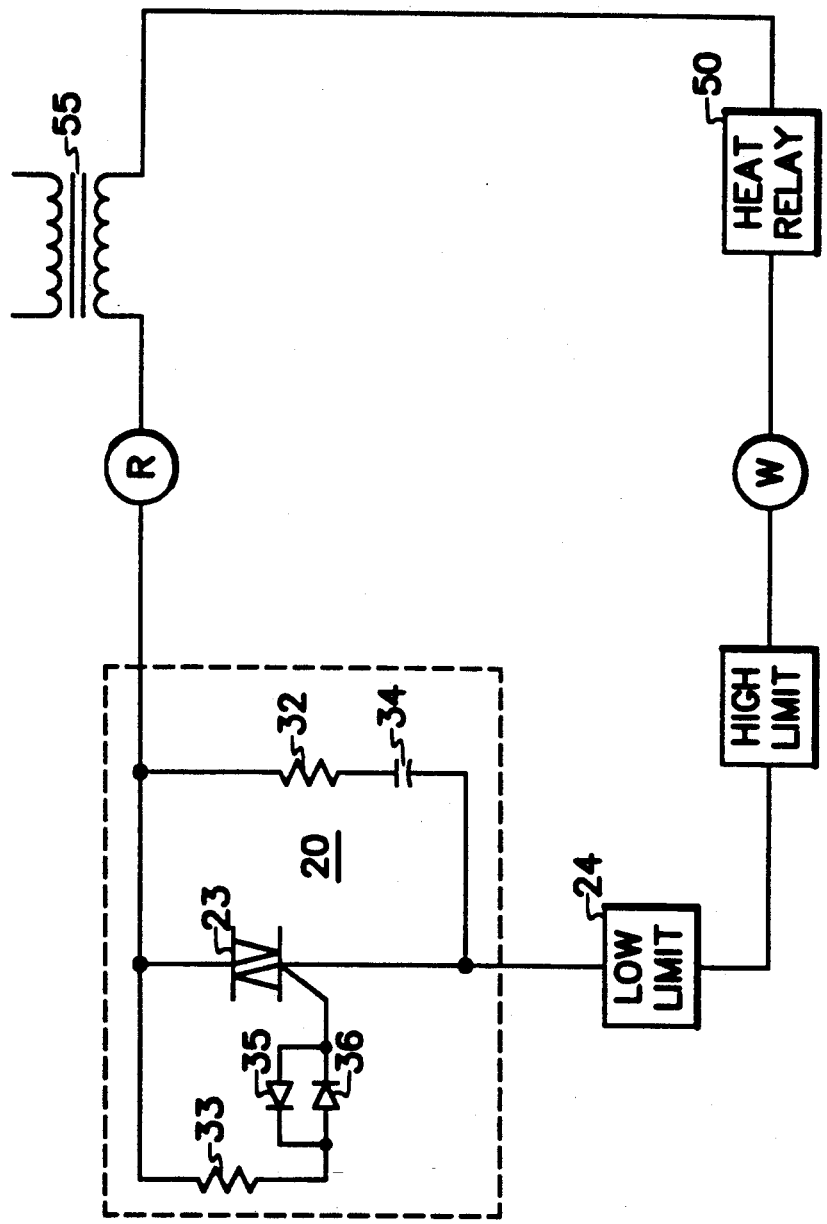
FIG. 3 is a schematic diagram of the low limit circuit when the thermostat does not have sufficient power to operate.

When FET 21 is in an "off" position, the circuit now operates in a manner shown in FIG. 3. As thermostat control 10 can no longer operate, it is effectively removed from the circuit, as are diodes 26 through 29, due to the removal of the short provided by FET 21.

The circuit illustrated in FIG. 3 is now able to provide a complete path through low limit 24 due to the fact that the gate of triac 23 is now energized on each half cycle of 24 volt transformer 55. Thus, low limit switch 24 is now able to turn off or turn on heat as required in order to maintain a temperature of approximately 55 F in the controlled space.

Figure 4:
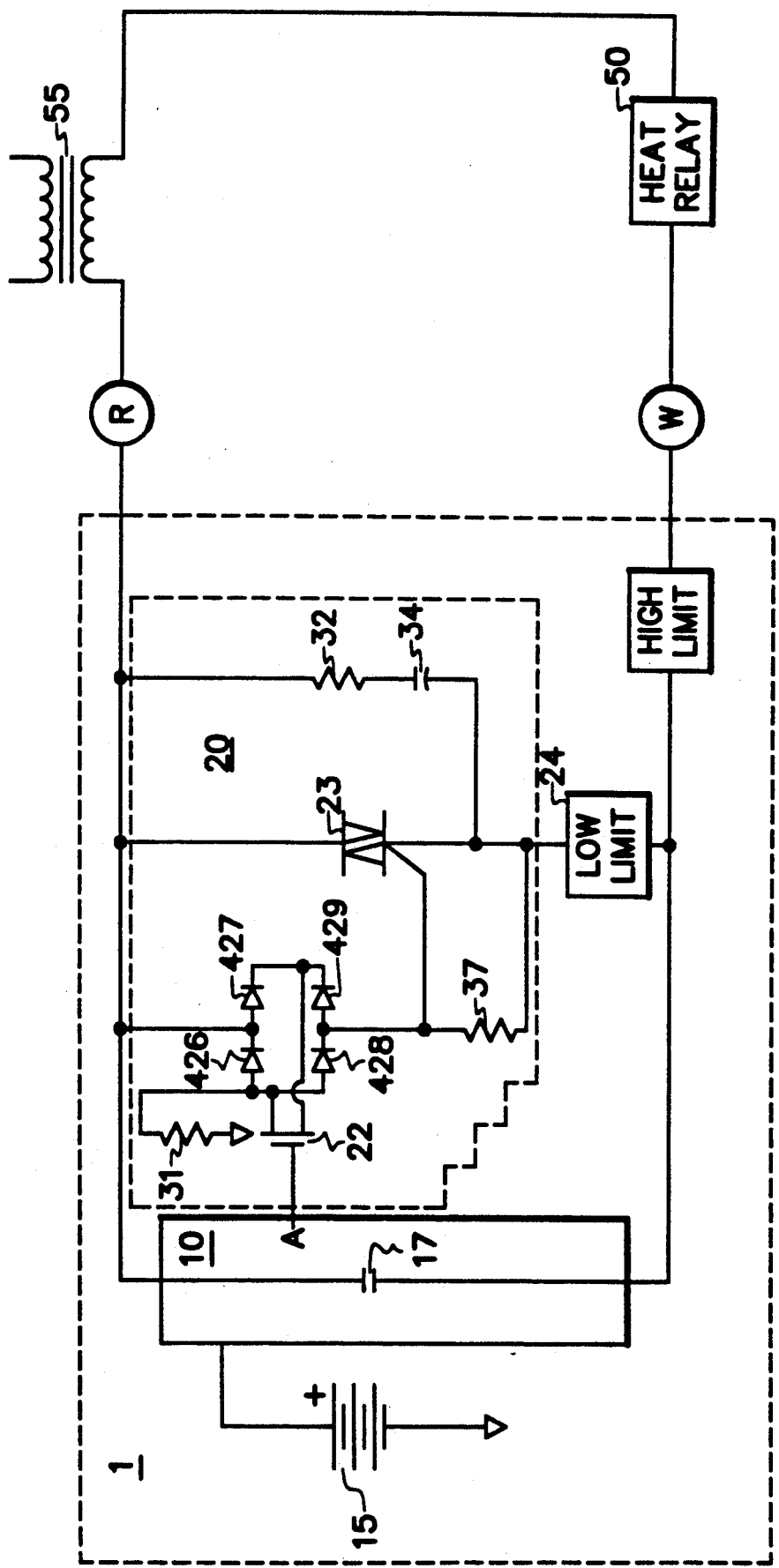
FIG. 4 is a second embodiment of Applicant's invention.

A second embodiment of the invention is shown in FIG. 4. The schematic diagram of FIG. 4 is similar to that of FIG. 1, with the exception that resistor 33 and the diode bridge, made up of diodes 26, 27, 28 and 29, have been interchanged. The diode bridge of diodes 26, 27, 28 and 29 is now electrically connected to node R and resistor 33 is now electrically connected to low limit bimetal switch 24. Diodes 35 and 36 have been replaced by a short. FET 21 of FIG. 1, which is an enhancement mode FET, is now FET 22 which is a depletion mode FET. The operation of the second embodiment is similar to that of FIG. 1 In this embodiment, however, FET 22 shorts out the diode bridge, consisting of diodes 426, 427, 428 and 429, when the battery power is no longer present and node A does not provide a signal. During operation when node A is energized, the short is removed and triac 23 is disabled.

Although only two embodiments are shown, it should be clear that the invention is not limited to the two embodiments shown. Applicant's invention is possible by incorporating any switch controlled device which utilizes an input from thermostat control 10 in which the switch is on for low battery voltage and off for normal battery voltage. For instance, controllable switch 20 could comprise a solid state relay. The concern in design is to limit the current usage and thereby not limit battery life.

I claim:

1. A low temperature limit switch for a battery powered thermostat for energizing and de-energizing a heating system, said thermostat comprising:
    a) a battery powered thermostat control for energizing and de-energizing a said heating system; and
    b) a low temperature limit electrically connected in parallel with said battery powered thermostat control, said battery powered thermostat control disabling said low temperature limit when said battery is charged, said battery powered thermostat control enabling said low temperature limit when said battery is discharged, whereby when said battery is discharged said low temperature limit energizes said heating system when the ambient temperature present on said thermostat is below a pre-selected temperature.

2. The low temperature limit of claim 1 wherein said low temperature limit comprises:
    a) a bimetal switch; and
    b) a controllable switch, said controllable switch receiving a disable signal from said battery powered thermostat control when said battery is charged, whereby when said battery is discharged said controllable switch enable said bimetal switch.

3. The low temperature limit of claim 2, wherein said controllable switch comprises a triac for enabling said bimetal switch.

4. The low temperature limit of claim 3 wherein said controllable switch further comprises:
    a) a field effect transistor with a gate, a drain and a source, said gate of said field effect transistor receiving said disable signal from said thermostat control; and
    b) a diode bridge electrically connected to said field effect transistor and said triac, said diode bridge disabling said triac when said disable signal from said thermostat control is present.

5. The low temperature limit of claim 4 wherein said field effect transistor is a depletion mode field effect transistor.

6. The low temperature limit of claim 4 wherein said field effect transistor is an enhancement mode field effect transistor.

* * * * *